United States Patent
Okamoto

(10) Patent No.: US 6,590,357 B2
(45) Date of Patent: Jul. 8, 2003

(54) OPENING AND CLOSING CONTROL DEVICE FOR COVER

(75) Inventor: Kiyoshi Okamoto, Hekinan (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/954,042

(22) Filed: Sep. 18, 2001

(65) Prior Publication Data

US 2002/0036475 A1 Mar. 28, 2002

(30) Foreign Application Priority Data

Sep. 18, 2000 (JP) ........................................ 2000-281466

(51) Int. Cl.[7] ................................................ H02P 6/00
(52) U.S. Cl. ........................... 318/467; 318/445; 49/26; 49/28
(58) Field of Search ................................. 318/467, 445; 49/26, 28

(56) References Cited

U.S. PATENT DOCUMENTS 5,351,439 A * 10/1994 Takeda et al. ................. 49/28
5,610,484 A * 3/1997 Georgin ...................... 318/286
6,320,342 B1 * 11/2001 Yoshioka et al. ............ 318/264

FOREIGN PATENT DOCUMENTS

| DE | 42 00 972 A1 | 7/1992 |
| DE | 44 20 692 A1 | 12/1994 |
| DE | 43 16 898 C3 | 1/1999 |
| DE | 198 35 091 C1 | 6/1999 |
| DE | 198 40 164 A1 | 3/2000 |
| JP | 5-25686 | 4/1993 |

* cited by examiner

Primary Examiner—Rita Leykin

(57) ABSTRACT

A opening and closing control device for a cover provided at an opening includes an electric motor for actuating the cover to open and close the opening, at least two rotational number sensors for generating pulse signals which have different phases from one another based on a rotational number of the electric motor, and a position detector for detecting the position of the cover based on one of the pulse signals and for judging a moving direction of the cover in accordance with a signal level of one of the rotational number sensors when the other rotational number sensor detects an edge of the pulse signal.

6 Claims, 18 Drawing Sheets

Fig. 5

(a) Rotational Direction CW →

1 2 3 4 5 6 7 8 9 10 11

ICa
ICb (b)

| | 1 | 2 | 3 | 4 | 5 | 6 | 7 | 8 | 9 | 10 | 11 |
|---|---|---|---|---|---|---|---|---|---|---|---|
| Count | +1 | | -1 | | +1 | | -1 | | +1 | | -1 |
| ICa | LO | LO | LO | LO | LO | LO | LO | LO | LO | LO | LO |
| ICb | HI→LO | LO | LO→HI | HI | HI→LO | LO | LO→HI | HI | HI→LO | LO | LO→HI |
| Abnormality Count | | | ① | | ② | | ③ | | ④ | | ⑤ |

OPENING AND CLOSING CONTROL DEVICE FOR COVER

This application is based on and claims priority under 35 U.S.C. § 119 with respect to Japanese Application No. 2000-281466 filed on Sep. 18, 2000, the entire content of which is incorporated herein by reference.

FIELD OF THE INVENTION

The present invention generally relates to movable covers on a vehicle. More particularly, the present invention pertains to an opening and closing control device for a cover, such as a sunroof panel or a power-window pane, provided at an opening of a vehicle.

BACKGROUND OF THE INVENTION

Opening and closing control devices for controlling the movement of a cover provided at an opening of a vehicle in accordance with switch operation by an occupant of the vehicle are known. One example of such an opening and closing control device is disclosed in Japanese Patent Publication No. H05-25686. This document describes a sunroof opening and closing control device for controlling the slide opening/closing movement and tilt opening/closing movement of a sunroof panel. The sunroof panel is designed to perform the tilt open/close movement and the slide open/close movement in order by an electric motor and a drive unit. The sunroof panel is controlled to move in the tilt-open direction by rotating the electric motor in one direction from a completely closed position and is controlled to move in slide-open direction by rotating the electric motor in the reverse direction from a completely closed position.

In recent years, the opening and closing control device includes an entrapment prevention function which detects the entrapment of an occupant or an obstacle in the path of movement of a cover such as a sunroof panel and a power-window pane, and stops or reverses the open/close operation of the cover. Those opening and closing control devices require positional detection of the cover for controlling the open/close movement of the cover from the stopped condition or the condition moving in the reverse direction. In the aforementioned opening and closing control devices actuated by the electric motor, the position of the cover can be detected by detecting the rotational direction of the electric motor from a predetermined position and the rotational number to be calculated.

One method for positional detection of the cover involves detecting the position of the cover by calculating a pulse signal inputted from a Hall IC (i.e., a rotational number sensor) for detecting the rotation of a magnet disposed on the rotational shaft of the motor. In this method, the judgment of movement of the sunroof panel either in the open/close direction is performed referring to ON/OFF condition of a relay for controlling regular rotation, reverse rotation, and stopping of the motor. The calculation transaction of a positional counter is performed considering the stopping of the motor and the switching of the rotational direction.

However, with the foregoing method of positional detection judging the stopping of the motor and the timing of the reversion from ON/OFF condition of the relay, the motor is rotated by inertia for a while after the judgment of the motor stopping and the reversion. This rotation by inertia of the motor is not calculated on the positional counter. In addition, there is a possibility for a calculation error due to the possible counting of noise in the pulse signal.

Accordingly, a position detection switch for detecting the absolute position of the sunroof panel may be employed other than the sensor for generating the pulse signal such as the Hall IC in order to correct the calculated value (i.e., the position of the sunroof panel) of the positional counter based on a detection signal of the position detection switch. The sensor for positional correction such as the position detection switch is in most cases provided separate from the position of the motor and the control unit. Thus, a relatively long harness is required in addition to the position detection switch. Thus, known devices such as those discussed above suffer from drawbacks involving an increase in the size of the device, an increase in the number of components forming the device, relatively complicated control, and an increase in manufacturing cost due to the complex assembly procedure. These drawbacks lead to reduced manufacturing efficiency.

In light of the foregoing, a need exists for an opening and closing control device for a cover of an opening in a vehicle which is not as susceptible to the same drawbacks a discussed above.

A need also exists for an opening and closing control device which is able to detect the position of the cover with relatively high accuracy through use of a relatively simple construction, such as through use of a rotational sensor only.

SUMMARY OF THE INVENTION

According to one aspect of the invention, an opening and closing control device for a cover provided at an opening includes an electric motor for actuating the cover to open and close the opening, at least two rotational number sensors for generating pulse signals which have different phases from one another based on a rotational number of the electric motor, and a position detecting mechanism for detecting the position of the cover based on one of the pulse signals and for judging a moving direction of the cover in accordance with a signal level of one of the rotational number sensors when the other rotational number sensor detects an edge of the pulse signal.

With this construction, the rotational direction of the electric motor is judged by pulse signals having different phases which are generated by at least two rotational sensors. In this case, the edges of the signals from the past are not used for judgment. Instead, a signal level of one of rotational sensors which can be detected simultaneous with the edge of the other rotational sensor is used. Thus, the rotational direction can be judged immediately, even in the condition that reliable information cannot be obtained from the memory. Accordingly, the rotational direction can always be accurately judged and the error in the rotational number is not as likely to occur. This enables the positional detection of the cover with a relatively high degree of accuracy.

In accordance with another aspect of the invention, a opening and closing control device for a cover provided at an opening includes an electric motor which actuates the cover to open and close the opening, with the electric motor having a shaft on which is provided a magnet, and at least two rotational number sensors which generate pulse signals having offset phases based on rotation of the shaft and the magnet. The control device also includes a mechanism which determines the position of the cover based on one of the pulse signals and for judging a direction of rotation of the shaft based on a determination of a signal level of the pulse signal from one of the rotational number sensors when an edge of the pulse signal from the other rotational number sensor is detected.

BRIEF DESCRIPTION OF THE DRAWING FIGURES

The foregoing and additional features and characteristics of the present invention will become more apparent from the following detailed description considered with reference to the accompanying drawing figures in which like reference numbers designate like elements and wherein:

FIG. 1 is a schematic illustration of a sunroof opening and closing control device according to an embodiment of the present invention;

FIGS. 2(a)–2(c) illustrate two charts and a graph showing signals of two Hall ICs;

FIG. 3 is a graph showing the signals of the Hall ICs when a rotational direction of the motor is changed;

FIGS. 4(a) and 4(b) illustrate a graph and a chart showing the signals of the Hall ICs when an abnormality is generated in one of the Hall ICs;

FIGS. 5(a) and 5(b) illustrate a graph and a chart showing the signals of the Hall ICs when an abnormality is generated in the other Hall IC;

FIG. 6 is a flowchart showing a rotational direction detection transaction;

FIGS. 7(a)–7(c) illustrate a flowchart showing a level low transaction of an output signal ICa;

FIGS. 8(a)–8(c) illustrate a flowchart showing a level high transaction of the output signal ICa;

DETAILED DESCRIPTION OF THE INVENTION

Figure 1:
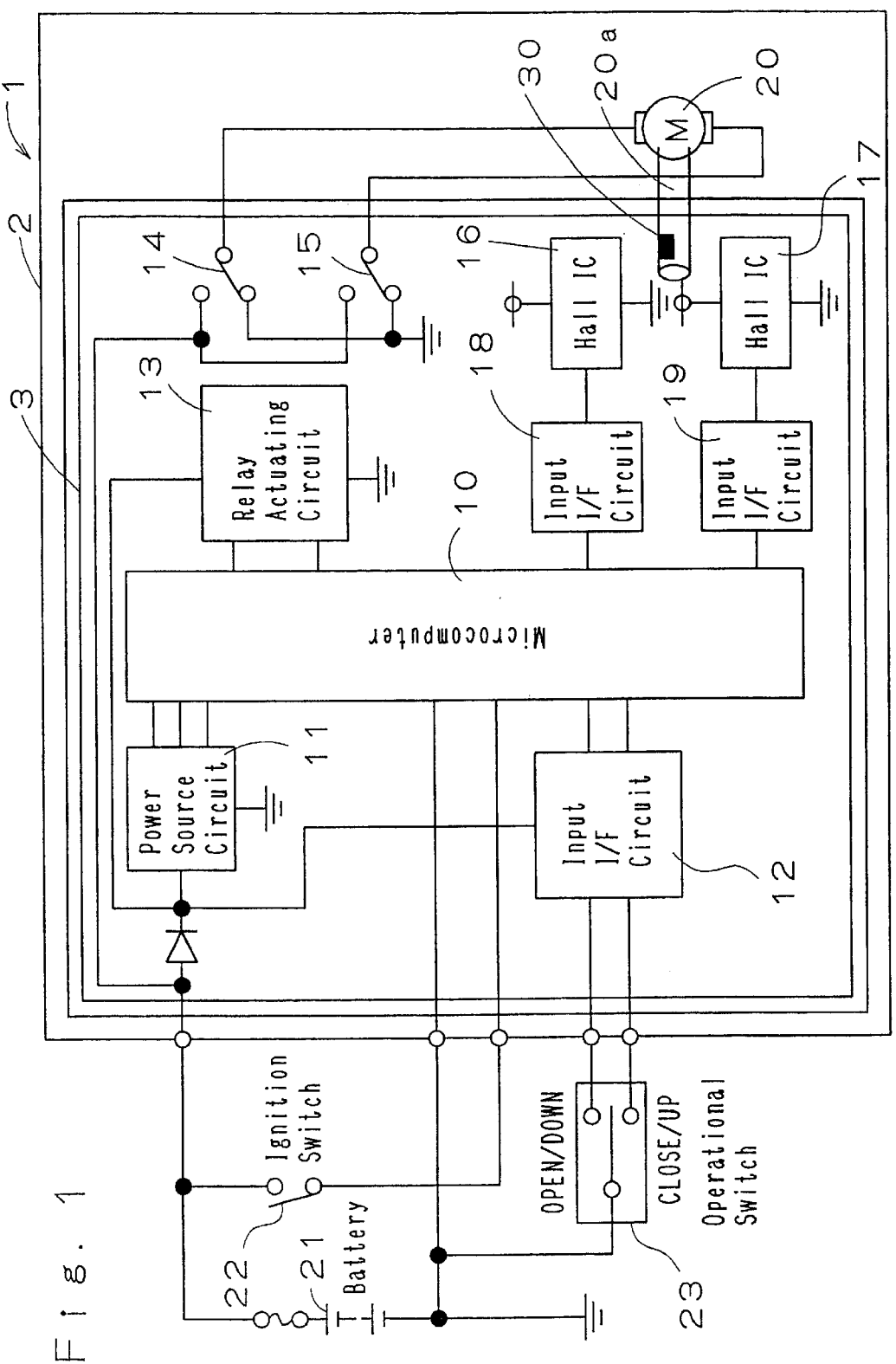

Referring initially to FIG. 1, a drive unit 2 includes an electric motor 20 for opening and closing a sunroof panel and a controller 3 for controlling actuation of the electric motor 20. The drive unit 2 is connected to a battery 21, an ignition switch 22 and an operational switch 23 located on a vehicle and is inputted with a positive electric potential of the battery 21 and signals from the respective switches 22, 23. The controller 3 includes a microcomputer 10, a power source circuit 11 for supplying electric voltage to the microcomputer 10, an input interface (I/F) circuit 12 for inputting signals from the operational switch 23, a relay actuating circuit 13 for actuating the electric motor 20, relays 14, 15, Hall ICs 16, 17 for detecting the rotation of the electric motor 20, and input interface (I/F) circuits 18, 19. The microcomputer 10 includes a timer and a memory as a memorizing means.

The operational switch 23 is disposed in the interior of the vehicle to permit occupants to operate the opening and closing of the sunroof panel. In accordance with the operational direction of the operational switch 23, Open/Down or Close/Up are operated to input signals or nothing is inputted at the neutral position of the switch. In this case, Open and Close indicate the directions regarding slide open/close operation. Down and Up indicate the directions regarding the tilt open/close. In a sunroof opening and closing controller 1, the electric motor 2 and a gear unit (not shown) are unitarily assembled and an output shaft of the gear unit is operatively connected to a slide mechanism and a tilt mechanism. According to this disclosed embodiment of the present invention, when the motor 20 is rotated in the regular direction from completely closed condition in which the sunroof panel is completely closed, the sunroof panel is slide-open and when the motor 20 is reversely rotated from the completely closed condition, the sunroof panel is tilt-open. That is, the sunroof panel is actuated in the order of tilt-open, completely closed, and slide-open from a tilt-open completely open position by the regular rotation of the motor 20. The sunroof panel is actuated in the order of slide close, completely closed, and tilt-up from a slide open completely open position by the reverse rotation of the motor 20. The operation switch 23 orders the regular rotation of the motor 20 by operation of Open/Down and the reverse rotation of the motor 20 by operation of Close/Up.

The rotational number of the motor 20 in each direction from a standard position is directly proportional to the moving distance of the sunroof panel via the gear unit. Accordingly, by cumulating the rotational number of the motor 20 determining the regular rotation as a positive direction and the reverse rotation as a negative direction from the completely closed position as a starting point, the moving distance of the sunroof panel from the starting point (i.e., the completely closed position), that is an absolute position of the sunroof panel, can be judged. By determining the rotational number of the motor 20 when the sunroof panel is positioned at the standard position and cumulatively memorizing the rotational number in accordance with the rotation of the motor 20, the absolute position of the sunroof panel at that time can be obtained.

The signal from the operational switch 23 is inputted into the microcomputer 10 via the input I/F circuit 12, the microcomputer 10 actuates the relays 14, 15 via the relay actuating circuit 13 in accordance with the signal, and the motor 20 is controlled. A magnet 30 is provided on a rotation shaft 20a of the motor 20. The magnetic flux opposing passing through the Hall ICs 16, 17 is changed by the rotation of the motor 20. Outputs obtained by detecting the magnetic flux change of the Hall ICs 16, 17 are inputted into the microcomputer 10 as pulse signals via the input I/F circuits 18, 19.

Figure 2:
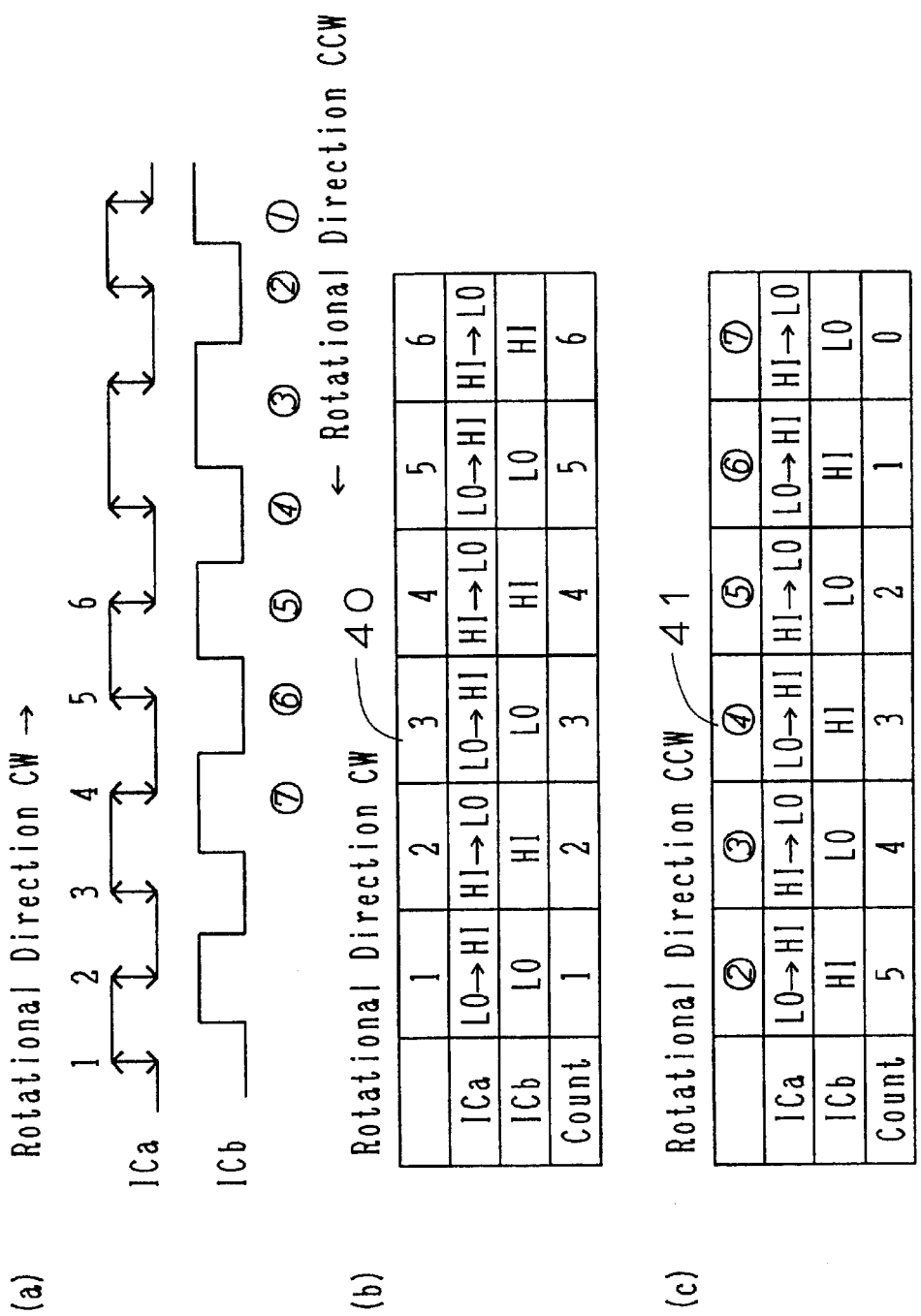

An example of the pulse signals is shown in FIGS. 2(a)–2(c). The output signal from the Hall IC 16 is determined as an output signal ICa, the output signal from Hall IC 17 is determined as an output signal ICb, the aforementioned regular rotational direction is determined as a rotational direction CW (clockwise direction), and the reverse rotational direction is determined as the rotational direction CCW (counterclockwise direction). FIG. 2 (a) is a graph showing the level of change of the output signal ICa and the output signal ICb. Each signal is changed from the left side to the right side of the illustrated graph in accordance with the passage of time for the rotational direction CW. Each signal is changed from the right side to the left for the rotational direction CCW. Two Hall ICs 16, 17 are provided to have outputs having edges whose positions are not overlapped with each other when detected. Each numeral 1–6 and ①–⑦ shows the timings that the output signal ICa detects the edges.

FIGS. 2 (b) and (c) are charts showing levels of the output signal ICa and the output signal ICb at the edge position of the output signal ICa in each rotational direction. As shown in the chart 40 in FIG. 2(b), the edges of the output signal ICa are detected at timings 1–6 in the rotational direction CW. The timings 1, 3 and 5 are rising edges and the timings 2, 4 and 6 are falling edges. In this case, the output signal ICb is as shown in the chart 40. When the output signal ICa has a rising edge, the low level is detected at the output signal ICb and the high level is detected when the ICa has a falling edge. Likewise, as shown in the chart 41 of FIG. 2(*c*), edges are detected at the timings ②–⑦ in the rotational direction CCW. The timings ③, ⑤ and ⑦ are rising edges and the timings ②, ④ and ⑥ are falling edges. In this case, as shown in the chart 41, in the output signal ICb, the high level is detected when the output signal ICa has a rising edge and the low level is detected when the output signal ICb has a falling edge. That is, when the output signal ICa detects the edge, by detecting the level of the output signal ICb at the same time period with its edge direction, it is judged whether the rotational direction is CW or CCW.

Accordingly, the rotational direction of the motor 20 is judged immediately by detecting the signal level of the output from one of two Hall ICs 16, 17 which is detected simultaneously with the edge direction of the other of the two Hall ICs 16, 17. One rotational direction of the motor 20, in this case, the rotational direction CW, is determined as the positive direction to cumulate the numbers of appeared edges to be a positional count as shown in the charts 40 and 41. By the positional count, the rotational number from the standard position of the motor 20 can be determined. Accordingly, the absolute position of the sunroof panel can be obtained. When the motor 20 is rotated in the rotational direction CCW, as shown in the chart 41, the number of edges is subtracted from the cumulated positional count.

Figure 3:
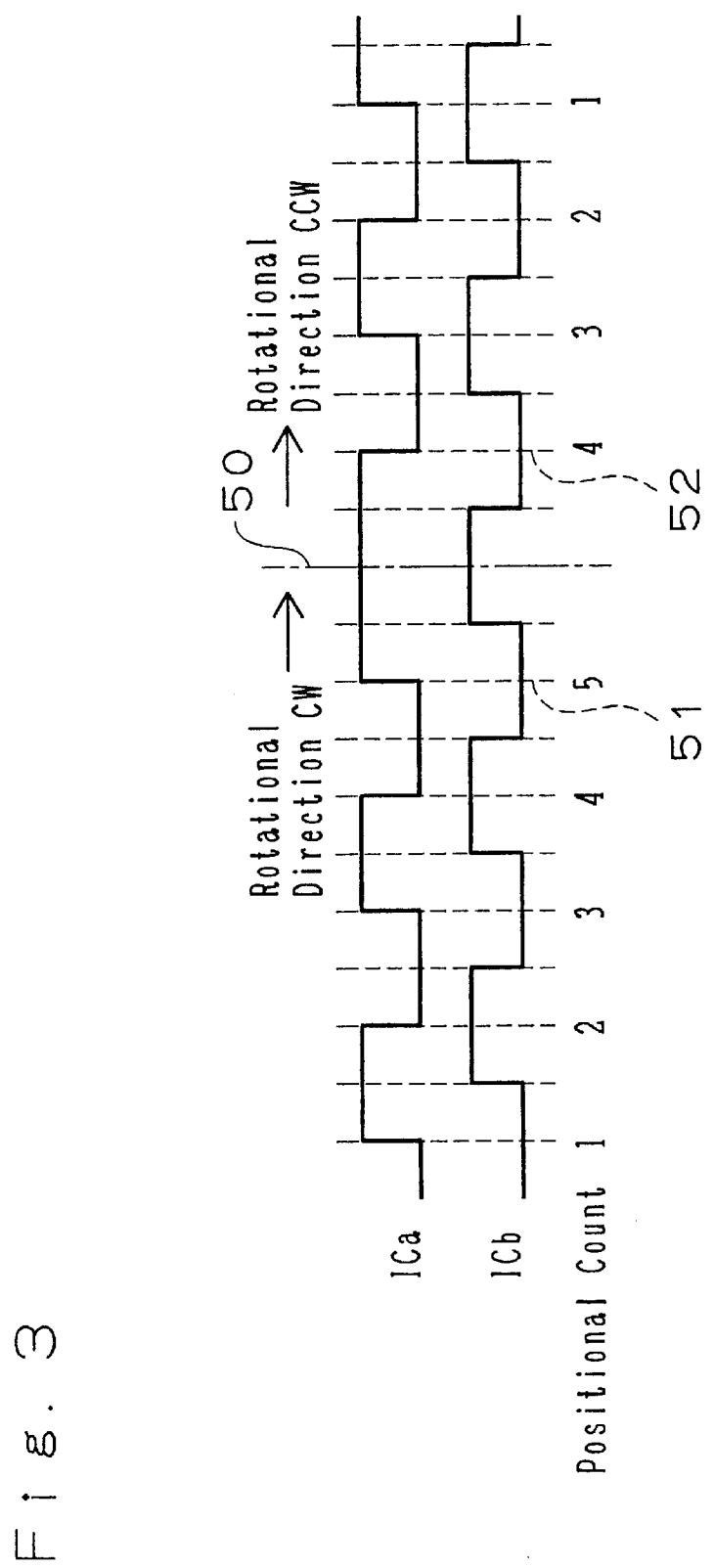

FIG. 3 shows the conditions of the Hall ICs 16, 17 when the rotational direction of the motor 20 is changed during operation. The motor 20 rotates in the rotational direction CW until a timing 50 and is changed to the rotational direction CCW after the timing 50. As shown in FIG. 3, at a timing 51, the motor 20 rotates in the rotational direction CW because the output signal ICa has a rising edge and the level of the output signal ICb is low. At a timing 52, the motor 20 rotates in the rotational direction CCW because the output signal ICa has a falling edge and the level of the output signal ICb is low. Accordingly, the positional count value is added by one for every edge until the timing 51 and is subtracted by one for every edge after the timing 52. The positional count can thus be obtained correctly even when the rotational direction is changed during operation.

Figure 4:
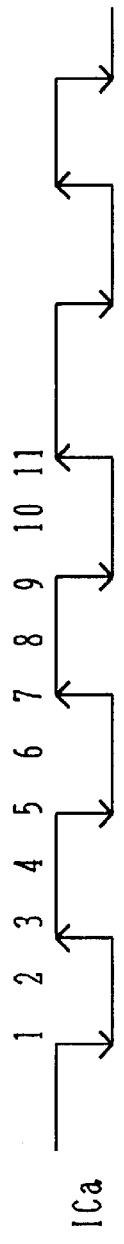

The case when an abnormality occurs in either one of the Hall ICs 16, 17 is described with reference to FIGS. 4(*a*)–(*b*) and FIGS. 5(*a*)–(*b*). When an abnormality such as disconnection and short circuit occurs in the Hall IC 16 or 17, the signal generated by the Hall IC maintains either the high level or the low level and does not change. FIGS. 4(*a*)–(*b*) show the case when the output signal ICb of the Hall IC 17 is maintained at a low level. In this case, the output signals ICa, ICb become as shown in the chart. In this case, as shown in the chart, it is judged that the motor 20 is rotating in the rotational direction CCW because the output signal ICa has falling edges at timing 1, 5 and 9 when the output signal ICb is at low level. At timings 3, 7 and 11, it is judged that the motor 20 rotates in the rotational direction CW because the output signal ICa has a rising edge and the output signal ICb is at low level. That is, this shows that the rotational direction is reversed every edge. Because the rotational direction does not reverse with this frequency in the normal condition, it is judged that the Hall IC 17 has experienced an abnormality when the reversion continues for a predetermined number of times when counting the number of reversions.

Likewise, FIGS. 5(*a*) and (*b*) show the case when the Hall IC 16 has experienced an abnormality. As shown in FIG. 5(*a*), the output signal ICa is maintained at a low level. In this case, because the edges of the output signal ICa are not detected, the edges of the output signal ICb are used for edge detection as explained hereinafter with reference to the flowchart. As shown in FIG. 5(*b*), it is judged that the rotational direction is reversed every time an edge is generated. Thus, the occurrence of an abnormality in the Hall IC 16 is immediately judged.

FIGS. 6–14 show flowcharts associated with a rotational direction detecting transaction for judging the rotational direction of the motor 20 by using the levels of the output signals ICa, ICb of the Hall ICs 16, 17. The rotational direction detecting transaction is carried out in the microcomputer 10 every time each output signal ICa, ICb is inputted.

Figure 6:
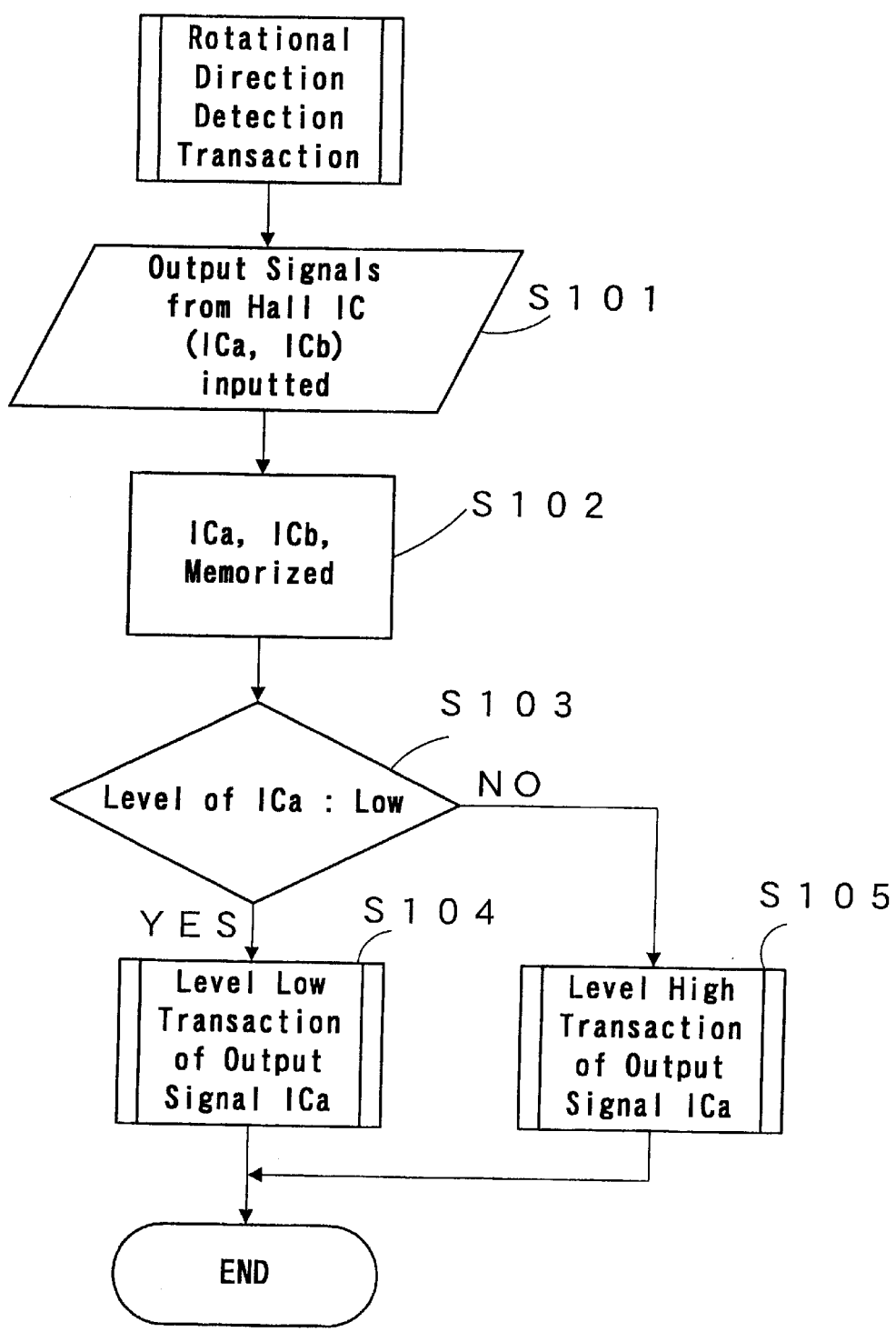

As shown in FIG. 6, when the rotational direction detecting transaction is carried out, the output signals ICa, ICb which are the signals of the Hall ICs 16, 17 respectively are inputted into the microcomputer 10 via the input I/F circuits 18, 19 at step S101. The inputted values are memorized in a storage device provided in the microcomputer 10 at step S102. Next, at step S103, it is judged whether or not the output signal ICa is at low level. A level low transaction of the output signal ICa is carried out at step S104 when the output signal ICa level is low. When the level of the output signal ICa is high, a level high transaction of the output signal ICa is carried out.

Figure 7:
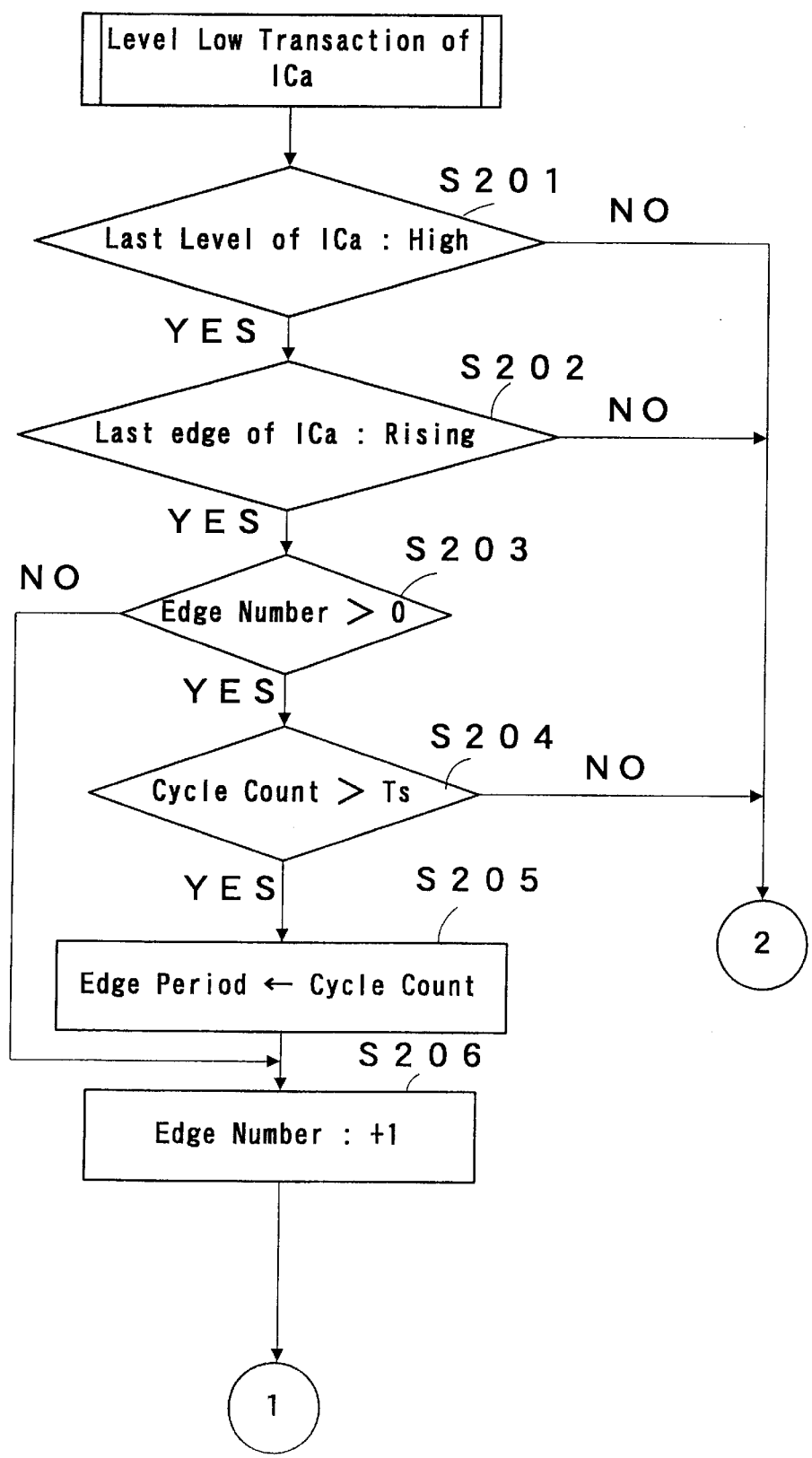
Figure 7:
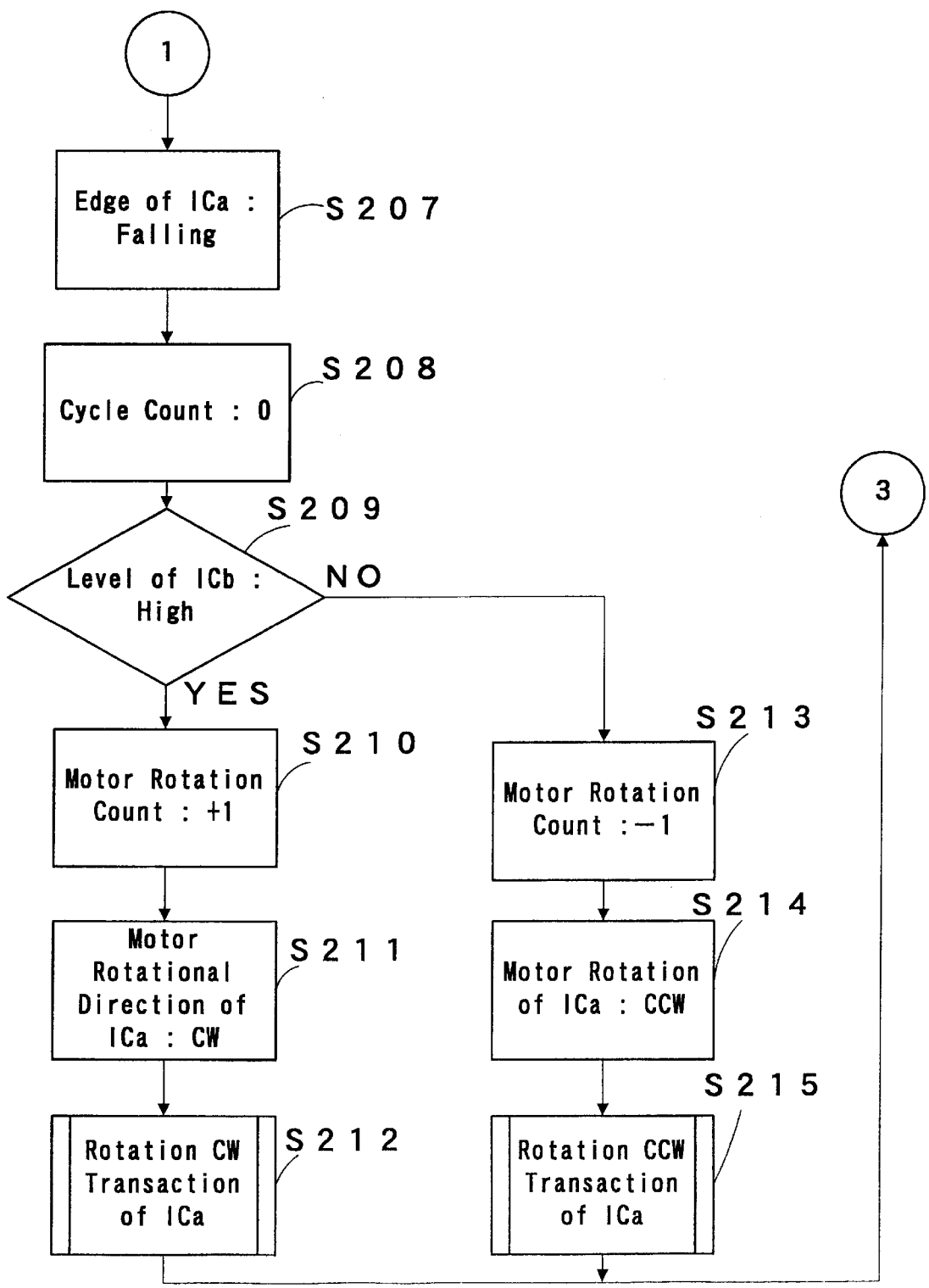
Figure 7:
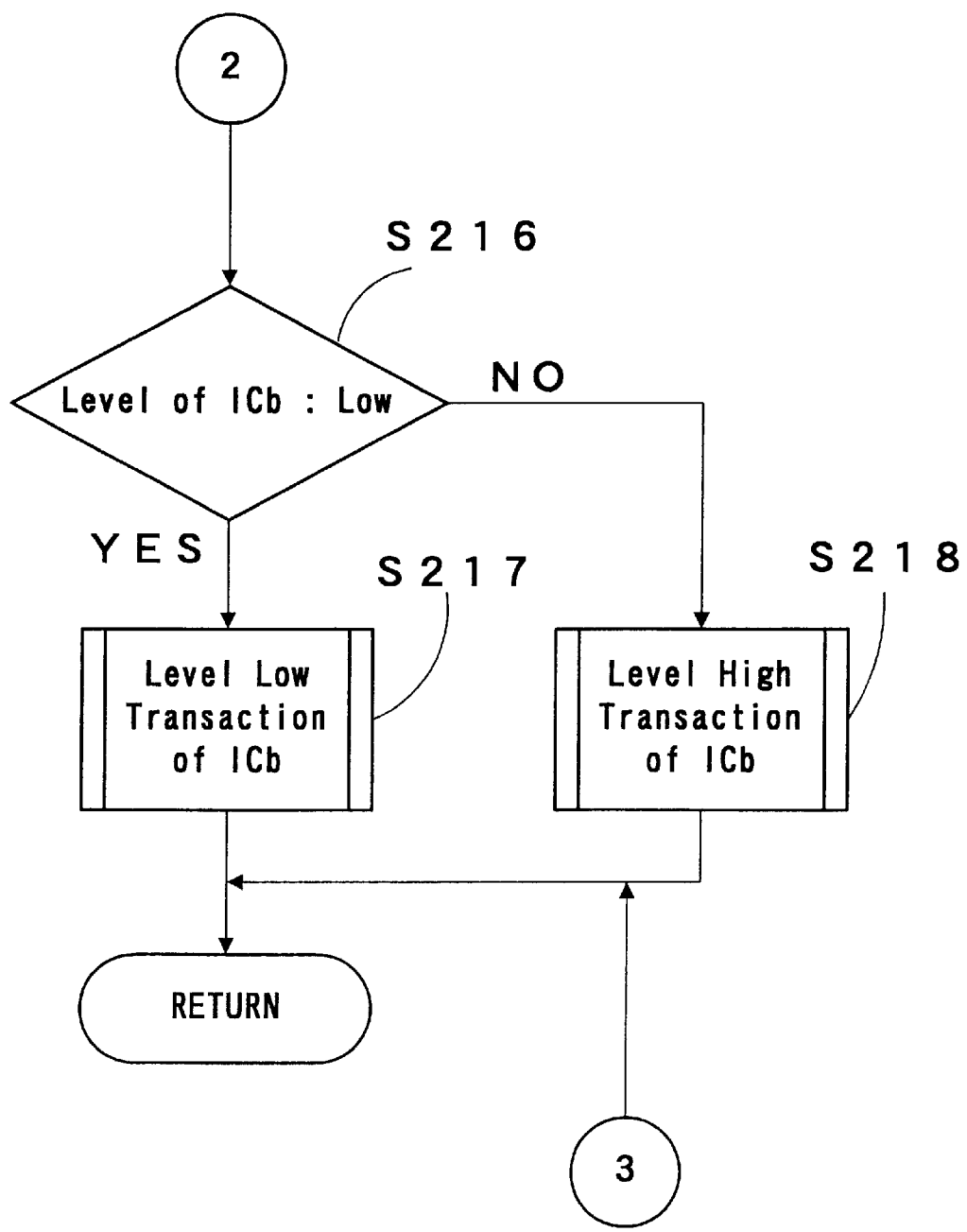
Figure 8:
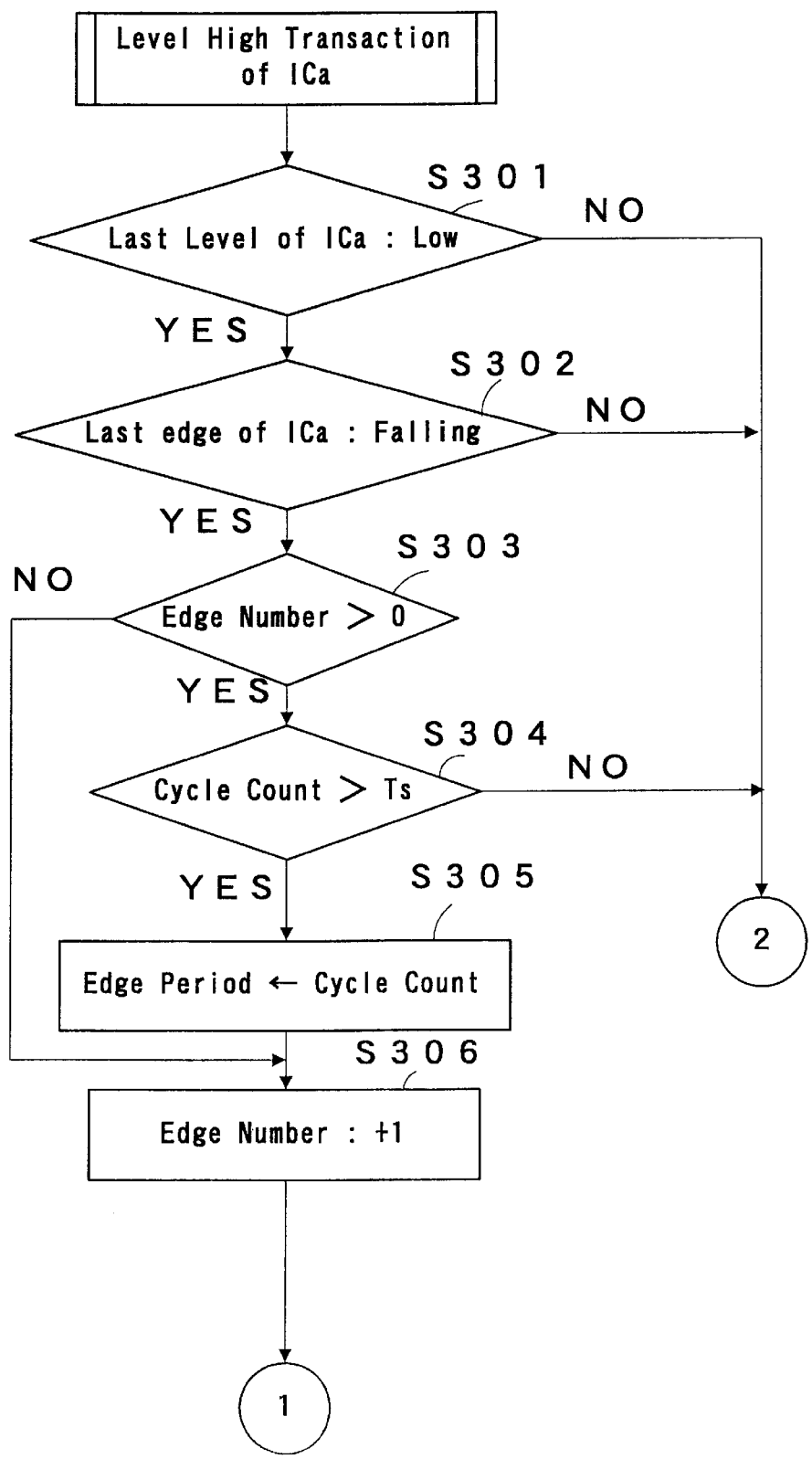
Figure 8:
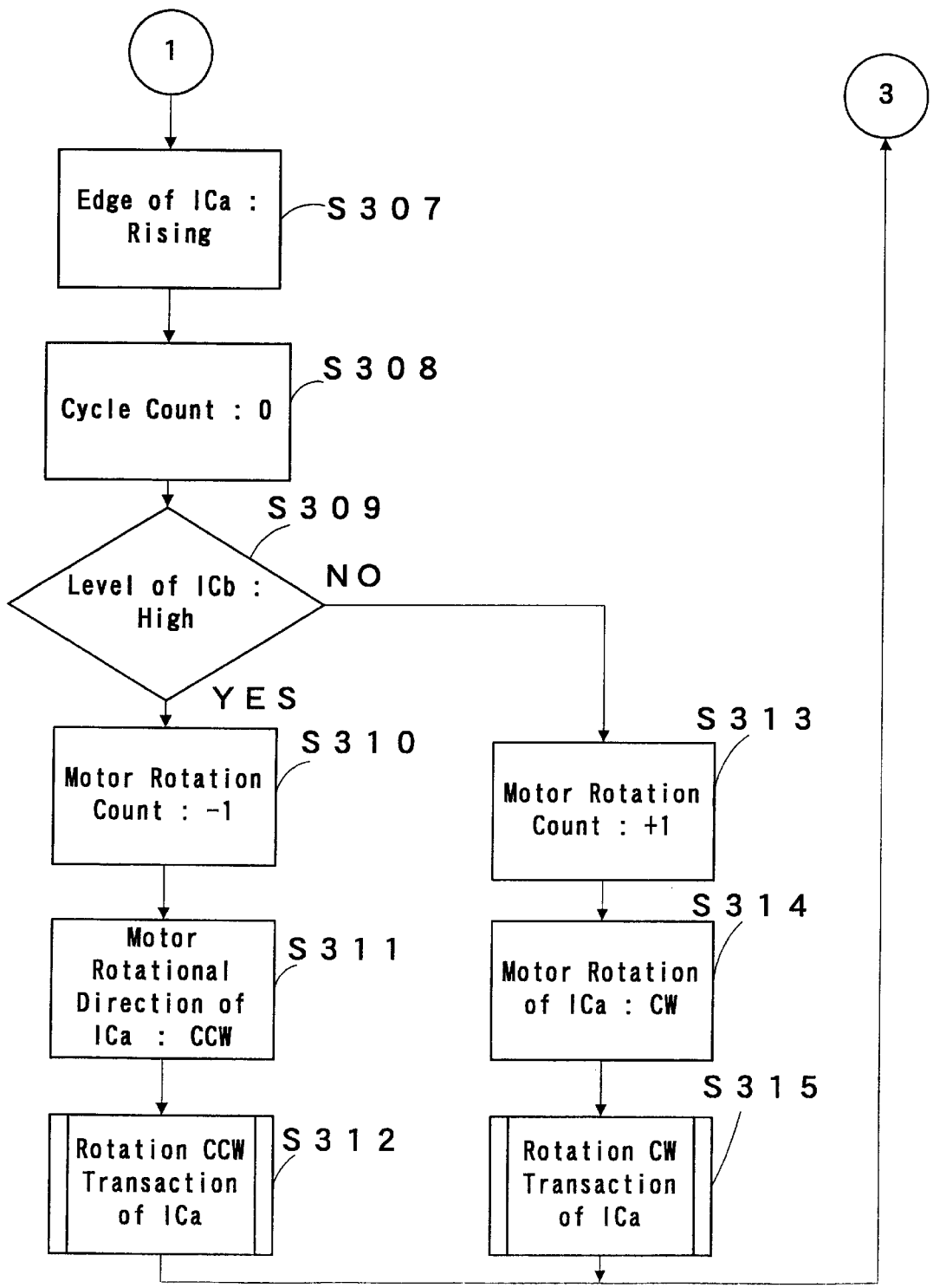
Figure 8:
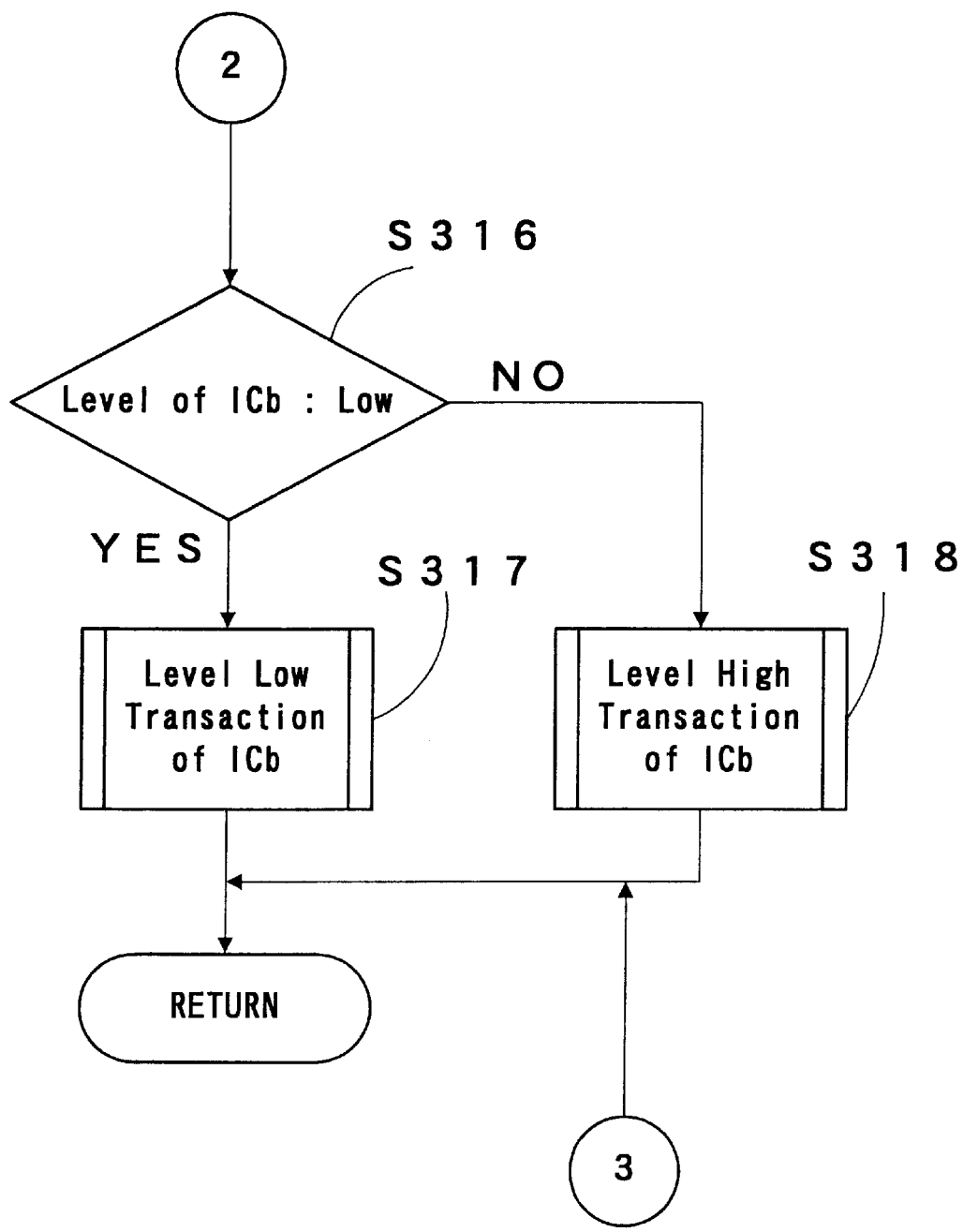

FIGS. 7(*a*)–(*c*) show a flowchart of the level low transaction of the output signal ICa. When the level low transaction of the output signal ICa is carried out, the microcomputer 10 reads out the level of the output signal ICa which is memorized the last time from the storage device. Then, in step S201, it is judged whether the read out last level of the output signal ICa is high. When the determination in step S201 is YES because the last output signal ICa is at a high level, the edge direction of the output signal ICa memorized last time is read out for purposes of judging in step S202 whether it is a rising edge. When the last edge of the output signal ICa shows rising edge (i.e., the determination in step S202 is YES), it is judged in step S203 whether there are edge numbers which have been counted. When it is determined that it is the first edge (i.e., the determination in step S203 is NO), the edge number is counted as one in step S206.

When it is determined in step S203 that it is not the first edge (i.e., the determination in step S203 is YES), it is judged whether a cycle count is larger than a predetermined value (Ts) in step S204. The cycle count corresponds to a time period between two edges and when the time period is extremely short, it is judged or determined that the edge found represents noise. That is, because the rotational number of the motor 20 has a maximum limitation, excessively fast rotation exceeding the maximum limit is not supposed to be obtained. When the cycle count is greater than the predetermined value Ts in step S204 (i.e., the determination in step S204 is YES), the edge is judged as a normal edge. The cycle count in this case is memorized as an edge period in step S205 and an edge number is counted as a positive one (+1) in step S206. Further, because the current edge is the falling edge changed from a high level to a low level in step S207, the cycle count is cleared in step S208 because the normal edge is detected to enable measurement of the interval to the next edge.

Figure 9:
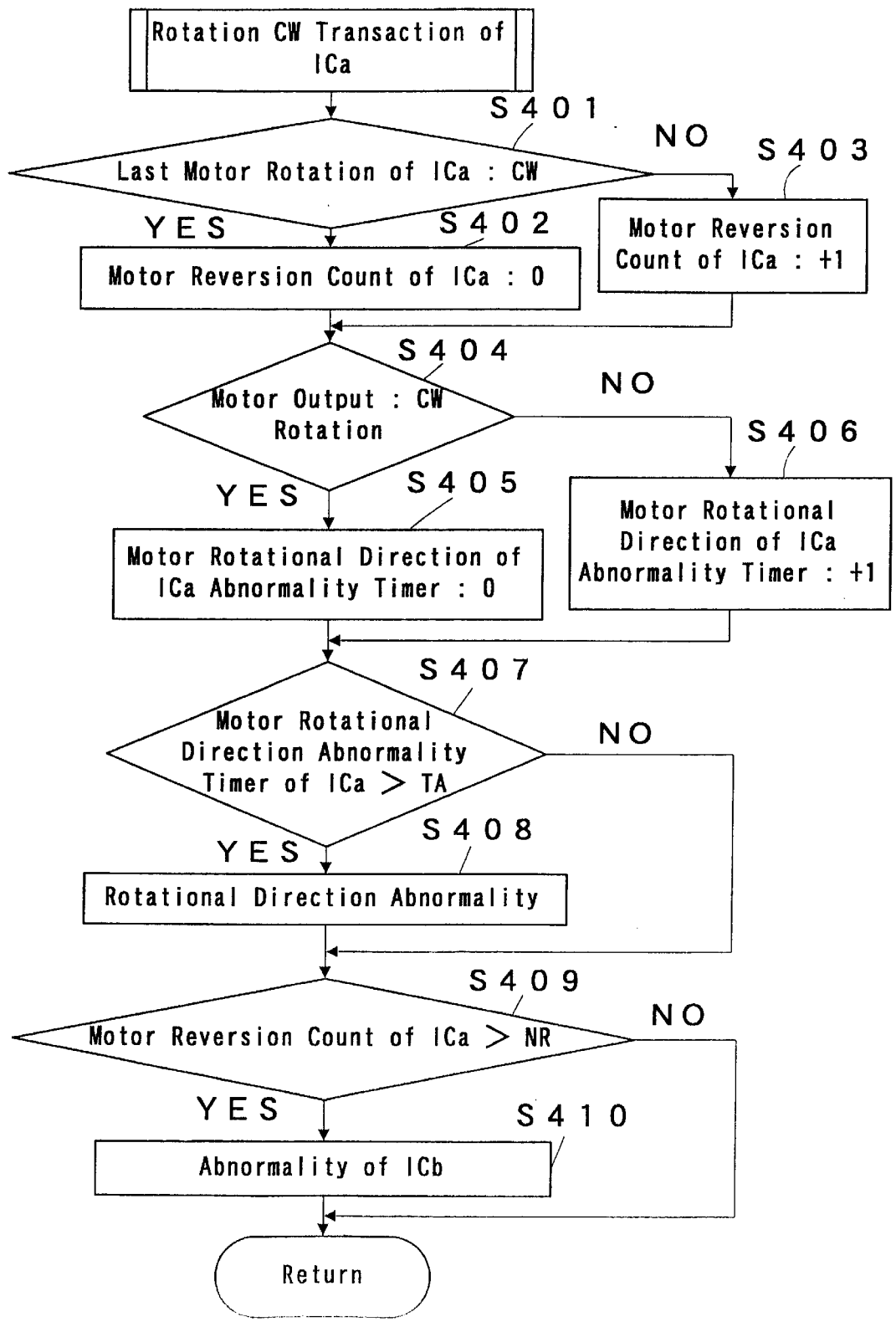
FIG. 9 is a flowchart showing a rotation CW transaction of the output signal ICa.

Next, the level of the output signal ICb inputted simultaneous with the output signal ICa is examined at step S209. When the level of the output signal ICb is high (i.e., the determination in step S209 is YES), the rotational direction of the motor 20 is judged as CW because the output signal ICa has a falling edge and the output signal ICb is at a high level. Accordingly, a motor rotational count corresponding to the cumulated rotation number of the motor 20 is added or incremented by one (+1) in step S210 and a determination is made at step S211 that the motor rotation of the output signal ICa is CW. In this case, the motor rotation corresponds to the rotational direction of the motor 20 judged based on the edge of the output signal ICa. Then, in step S212, a rotation CW transaction of the output signal ICa is carried out as shown in FIG. 9.

Figure 10:
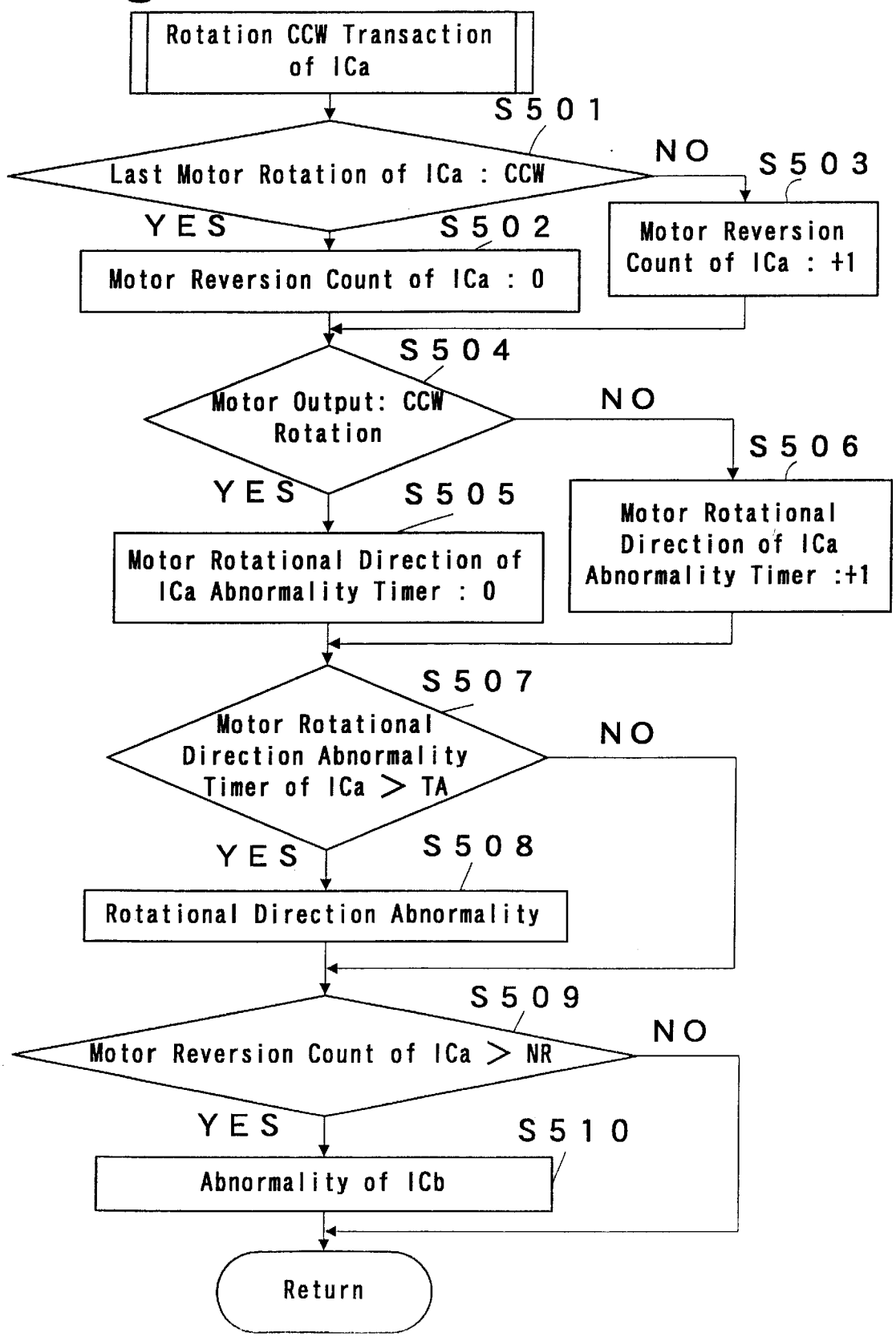
FIG. 10 is a flowchart showing a rotation CCW transaction of the output signal ICa.

When it is determined at step S209 that the output signal ICb is at a low level (i.e., the determination at step S209 is NO), the output signal ICa has a falling edge and the output signal ICb is at a low level. The rotational direction of the motor 20 in this case is thus judged as CCW. Accordingly, the motor rotational count is subtracted by one (−1) at step S213, the motor rotation of the output signal ICa is determined as CCW at step S214, and a rotation CCW transaction of the output signal ICa shown in FIG. 10 is carried out in step S215. When the rotation CW transaction of the output signal ICa or the rotation CCW transaction of the output signal ICa is ended, the execution of the level low transaction of the output signal ICa is completed.

Figure 11:
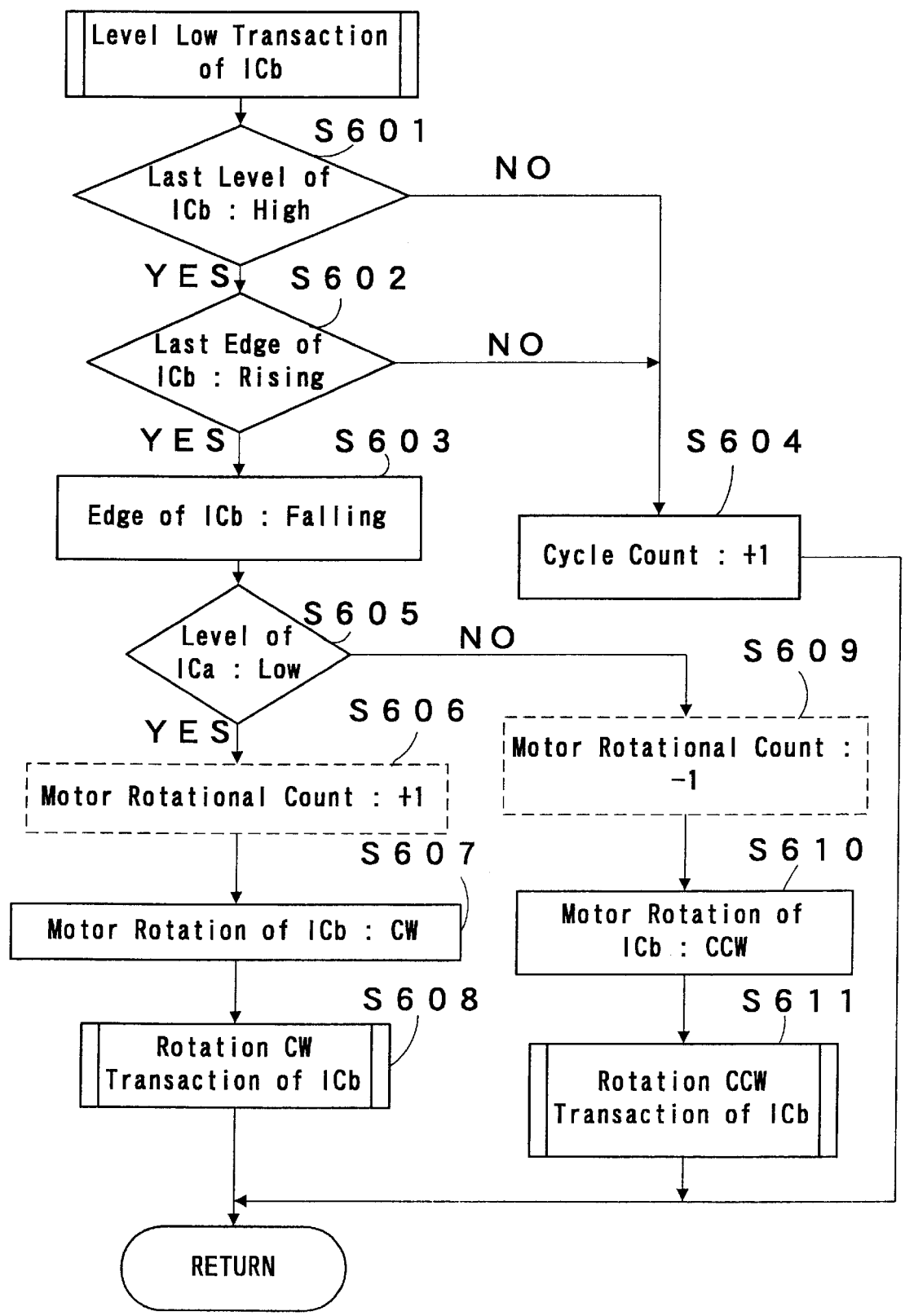
FIG. 11 is a flowchart showing a level low transaction of an output signal ICb.
Figure 12:
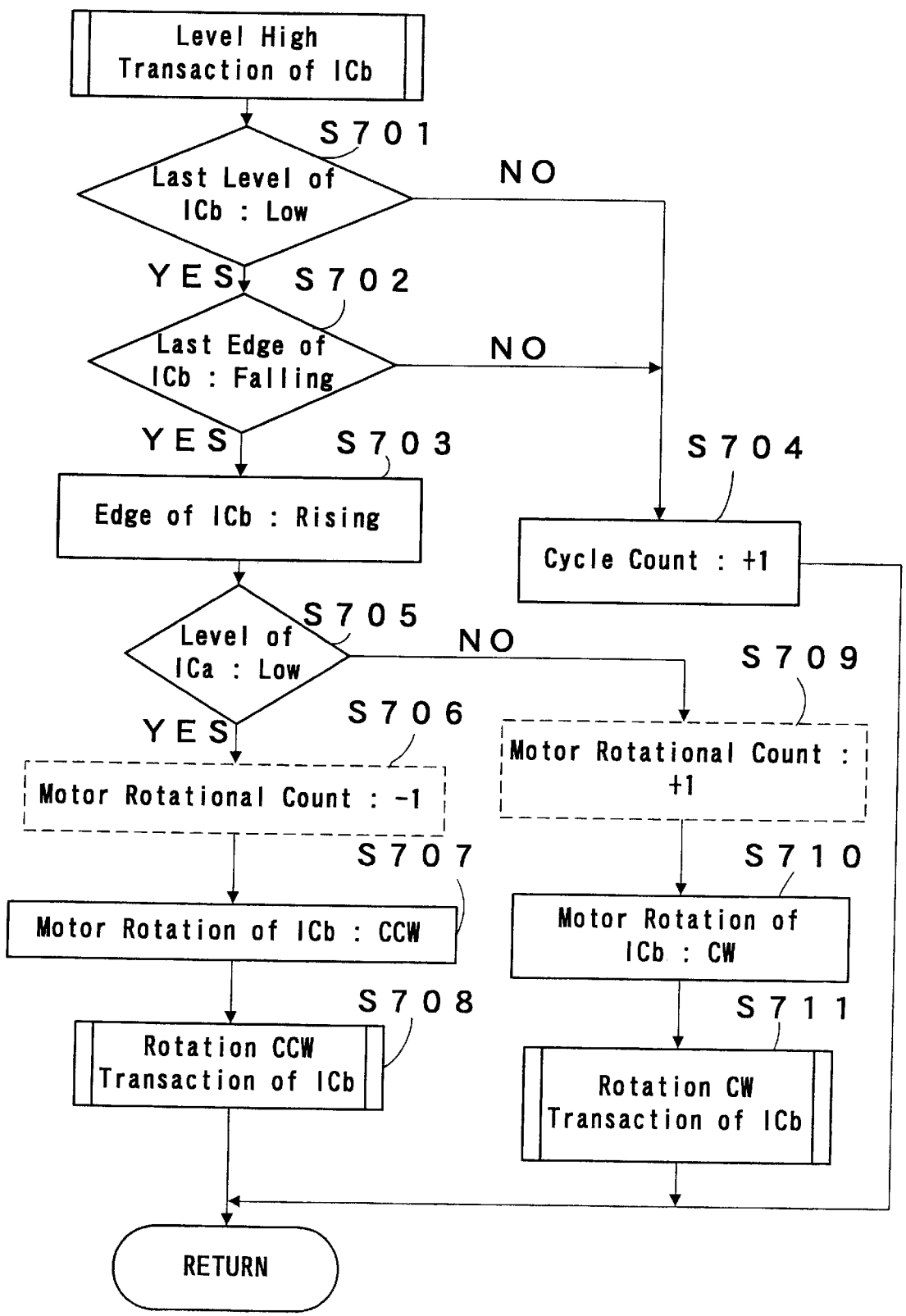
FIG. 12 is a flowchart showing a level high transaction of the output signal ICb.

On the other hand, when it is determined in step S201 that the last level of the output signal ICa is at a low level (i.e., the determination in step S201 is NO), when it is determined in step S202 that the last edge of the output signal ICa has a falling edge (i.e., the determination in step S202 is NO), or when it is determined in step S204 that the cycle count is not greater than the predetermined value Ts (i.e., the determination in Step S204 is NO), it is judged that the output signal ICa is not an edge and the routine proceeds to step S216. To perform the transaction regarding the level of the output signal ICb, the microcomputer 10 judges whether the level of the output signal ICb is at low level in step S216. When it is determined at step S216 that the level of the output signal ICb is low, the level low transaction of the output signal ICb shown in FIG. 11 is carried out in step S217. When it is determined at step S216 that the level of the output signal ICb is high, the level high transaction of the output signal ICb shown in FIG. 12 is carried out in step S218. When those transactions (i.e., the level low transaction of the output signal ICb and the level high transaction of the output signal ICb) are ended, the level low transaction of the output signal ICa is completed.

When it is determined at step S103 of the main routine shown in FIG. 6 that the level of the output signal ICa is at a high level (i.e., the determination in step S103 is NO), the level high transaction of the output signal ICa shown in FIGS. 8(a)–(c) is carried out. This transaction is approximately the same as the level low transaction of the output signal ICa other than that the edge direction is reverses as explained briefly below.

When the last level of the output signal ICa is a low level (i.e., the determination in step S301 is YES), when the last edge of the output signal ICa has a falling edge (i.e., the determination in step S302 is YES), and when it is determined in step S304 that the cycle count is greater than Ts, the edge number is added by one in step S306 to have a rising edge in step S307. Further, the motor rotational direction of the output signal ICa is determined in accordance with the level of the output signal ICb in step S309, and then either the rotation CCW transaction of the output signal ICa is carried out in step S312 or the rotation CW transaction of the output signal ICa is carried out in step S315. When it is judged that the output signal ICa is not an edge (i.e., the determination in step S301 is NO, the determination in step S302 is NO and the determination in step S304 is NO), the level low transaction of the output signal ICb is carried out in step S317 or the level high transaction is carried out in step S318 in accordance with the level of the output signal ICb.

The rotation CW transaction of the output signal ICa carried out when the motor rotation of the output signal ICa is judged as CW at the level high transaction of the output signal ICa (FIGS. 8(a)–(c)) or the level low transaction of the output signal ICa (FIGS. 7(a)–(c)) is explained below with reference to the flowchart of FIG. 9.

When the rotation CW transaction of the output signal ICa is carried out, the microcomputer 10 judges in step S401 whether the last motor rotational direction of the output signal ICa memorized in the storage device is the rotational direction CW. When the last rotational direction is the rotational direction CW and is thus the same as the current case (i.e., the determination in step S401 is YES), the motor reversion count of the output signal ICa is cleared in step S402 because there is no reversion. When the last rotational direction is not the rotational direction CW (i.e., the determination in step S401 is NO), it is judged that the reversion of the rotational direction has occurred and thus the reversion count is added by one (+1) in step S 403.

To actuate the motor 20 in accordance with the direction of the operational switch 23, it is judged in step S404 whether the rotational direction of the motor 20 to which the microcomputer 10 outputs signals to the relays 14, 15 via the relay actuating circuit 13 is CW. When the motor 20 rotates in the CW direction (i.e., the determination in step S404 is YES), the rotational direction is the same as the rotational direction judged by the output signal ICa. Accordingly, it is judged that there is no abnormality in the motor rotational direction of the output signal ICa and thus a motor rotational direction abnormality timer of the output signal ICa is cleared in step S405. On the other hand, when the motor 20 is not rotated in CW direction (i.e., the determination in step S404 is NO), the rotational direction result is different from the motor rotational direction of the output signal ICa. However, because the motor 20 continues to rotate for a while due to inertia when the sudden stop or the reversion (reverse operation) of the motor 10 occurs due to the detection of an entrapment (i.e., an item is entrapped by the cover), the occurrence of the abnormality cannot be judged immediately. Thus, provisionally, the motor rotational direction abnormality timer of the output signal ICa is added by one (+1) in step S406 to permit observation without taking any action.

When the edge by the output signal ICa is counted and when the rotational direction abnormality is judged every time the rotation CW transaction of the output signal ICa is carried out, the motor rotational direction abnormality timer of the output signal ICa is cumulated. Then, it is judged in step S407 whether the motor rotational direction abnormality timer of the output signal ICa is greater than a predetermined threshold value TA. When the motor rotational direction abnormality timer of the output signal ICa is greater than the predetermined threshold value TA (i.e., the determination in step S407 is YES), the rotational direction abnormality is continued and thus the abnormality transaction is performed at step S408.

The motor reversion count of the output signal ICa counted in Step S403 may be cumulated every time the rotational direction CW transaction of the output signal ICa is carried out. That is, in case it is judged that the rotational direction is reversed every edge of the output signal ICa and in case the level of the output signal ICb does not change as shown in FIG. 4. Accordingly, when the motor reversion count of the output signal ICa exceeds a predetermined threshold value NR (i.e., the determination in step S409 is YES), it is judged that the abnormality of the output signal ICb occurs and thus the abnormality transaction of the output signal ICb is performed in step S410. On the other hand, when neither the motor rotational direction abnormality timer of the output signal ICa nor the motor reversion count of the output signal ICa is cumulated and it is judged that both are not abnormal (i.e., the determination in step S407 is NO and the determination in step S409 is NO), the rotation CW transaction of the output signal ICa is completed without any transaction.

The rotation CCW transaction of the output signal ICa carried out when the motor rotation of the output signal ICa is judged as CCW during the level low transaction of the output signal ICa (FIGS. 7(a)–(c)) and the level high transaction of the output signal ICa (FIGS. 8(a)–(c)) will be explained with reference to the flowchart shown in FIG. 10. This transaction is approximately the same as the rotational direction CW transaction of the output signal ICa shown in the flowchart of FIG. 9 other than the difference with respect to the rotational direction.

When the last motor rotational direction of the output signal ICa is not CCW (i.e., the determination in step S501 is NO), the motor reversion count of the output signal ICa is added by one (+1) in step S503. When the output to the motor 20 is not CCW (i.e., the determination in step S504 is NO), the motor rotational direction abnormality timer of the output signal ICa is added by one (+1) in step S506. The motor reversion count of the output signal ICa and the motor rotational direction abnormality timer of the output signal ICa are the same as those associated with the rotation CW transaction of the output signal ICa of FIG. 9. When these values exceed respective threshold values (i.e., the determination in step S507 is YES and the determination in step S509 is YES), the abnormality transactions are performed respectively in step S508 and step S510.

The level low transaction of the output signal ICb and the level high transaction of the output signal ICb carried out in accordance with the level of the output signal ICb when the output signal ICa is not an edge during the level low transaction of the output signal ICa (FIGS. 7(a)–(c)) and the level high transaction of the output signal (FIGS. 8(a)–(c)) will be explained with reference to the flowchart of FIGS. 11 and 12.

As shown in FIG. 11, when the level low transaction of the output signal ICb is carried out, the microcomputer 10 reads out the last level of the output signal ICb memorized in the storage device to judge in step S601 whether the last level of the output signal ICb is at the high level. When the level of the last output signal ICb is at a high level (i.e., the determination in step S601 is YES), it is judged in step S602 whether the last edge of the output signal ICb is rising. When the last output signal ICb has the rising edge (i.e., the determination in step S602 is YES), it is judged that the level of the output signal ICb from the last to the current is changed from the high level to the low level and is judged as the falling edge in step S603. Because it is determined that the level of the current output signal ICb is not an edge when the last level of the output signal ICb is at a low level (i.e., the determination in step S601 is NO) or when the last edge of the output signal ICb has a falling edge (i.e., the determination in step S602 is NO), the cycle count is added by one (+1) in step S604 and thus the level low transaction of the output signal ICb is completed. The cycle count is judged by comparing with the threshold value during the level low transaction of the output signal ICa (FIGS. 7(a)–(c)) of Step S204 or the level high transaction of the output signal ICa (FIGS. 8(a)–(c)) of Step S304 to show the number of signals of which neither the output signal ICa nor the outputs signal ICb is the edge.

When the current level of the output signal ICb has a falling edge, it is judged in step S605 whether the level of the output signal ICa is low. Although in the foregoing method, the rotational direction of the motor 20 is judged by using the edge of the output signal ICa, the rotational direction can be judged by using the edge of the level of the output signal ICb as well. That is, the rotational direction of the motor 20 can be judged by observing the level of the output signal ICa when the output signal ICb has an edge. As shown in FIG. 2, the rotational direction is judged as the CW rotation when the output signal ICb has a rising edge and the level of the output signal ICa is high, or when the output signal ICb has a falling edge and the level of the output signal ICa is low. The rotational direction is judged as CCW when the output signal ICb has a rising edge and the level of the output signal ICa is at a low level, or when the output signal ICb has a falling edge and the level of the output signal ICa is at a high level.

Because the edge of the output signal ICb is falling in this case, if the level of the output signal ICa is at a low level (i.e., the determination in step S605 is YES), the rotational direction of the motor 20 judged by the edge of the output signal ICb is CW rotation. Hence, the motor rotational count is added by one (+1) in step S606, the motor rotation of the output signal ICb which is the rotational direction of the motor 20 judged by the edge of the output signal ICb is determined to be CW in step S607, the rotation CW transaction of the output signal ICb is carried out in step S608, and a series of the transaction is completed. In this case, the dashed line in step S606 shows that step S606 is not carried out when the motor rotational count is counted by the edge of the output signal ICa (i.e., steps S210 and S213 of FIG. 7(b), and steps S310 and S313 of FIG. 8(b)) so as not to count the motor rotation twice. When the motor rotational count is not counted by the edge of the output signal ICa, the motor rotation is counted in Step S606.

When it is determined at step S605 that the level of the output signal ICa is at a high level (i.e., the determination in step S605 is NO), the rotational direction of the motor 20 judged by the edge of the output signal ICb is CCW. In this case, the motor rotational count is subtracted by one (−1) in step S609, the motor rotation of the output signal ICb is set to be CCW in step S620, and the rotation CCW transaction of the output signal ICb is carried out in step S611. The transaction is thus completed. The dashed line of step S609 shows that step S609 is not carried out when the motor rotational count is counted by the edge of the output signal ICb in a manner similar to that described above with reference to step S606.

FIG. 12 shows a flowchart of the level high transaction of the output signal ICb. This transaction is approximately the same as the level low transaction of the output signal ICb in FIG. 11, other than the differences in the level of the output signal ICb and the edge direction of the output signal ICb. Steps S701–S711 of FIG. 12 correspond to Steps S601–611 of FIG. 11 and so a detailed explanation of these steps need not be repeated here.

Figure 13:
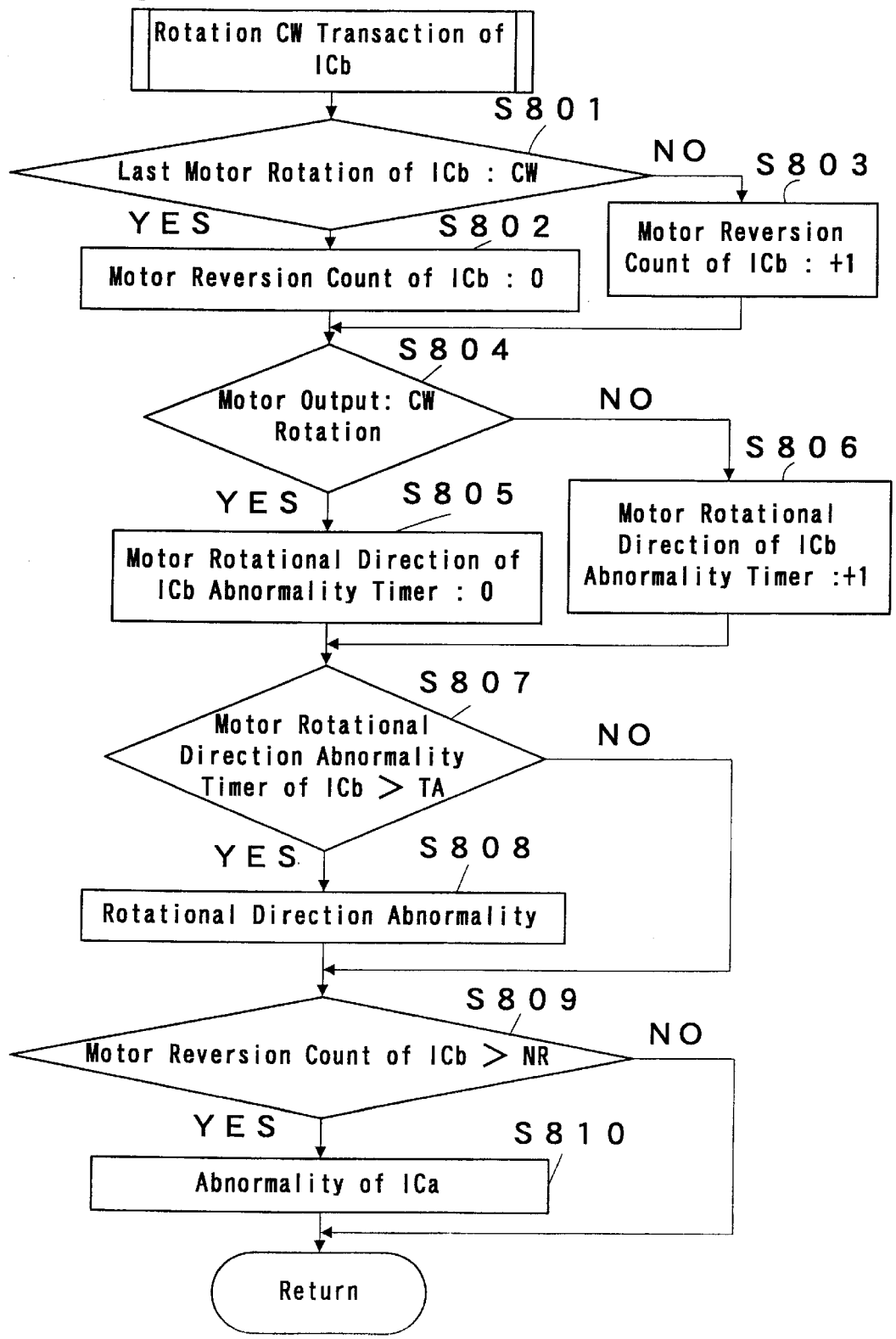
FIG. 13 is a flowchart showing a rotation CW transaction of the output signal ICb.
Figure 14:
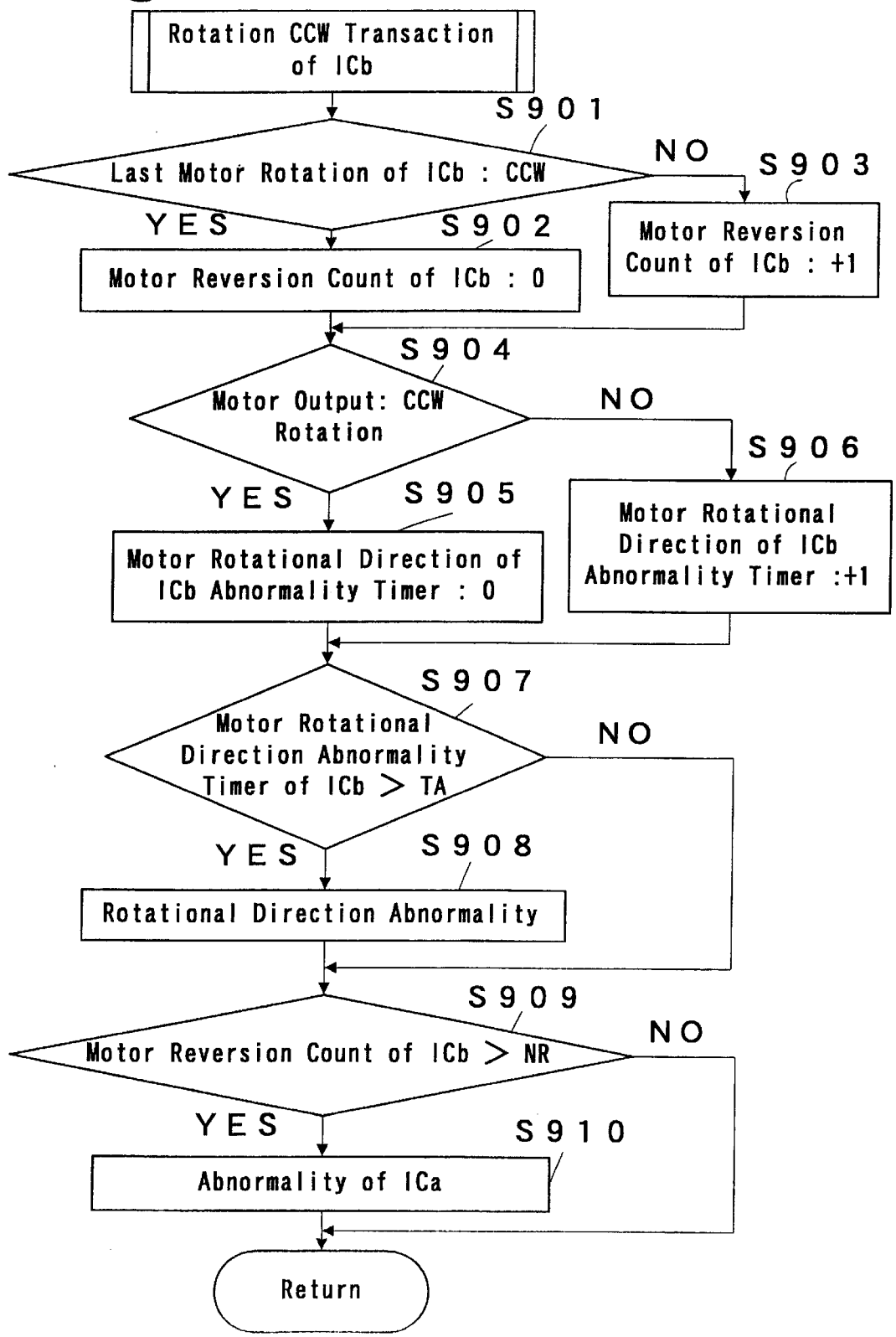
FIG. 14 is a flowchart showing a rotation CCW transaction of the output signal ICb.

FIGS. 13 and 14 show flowcharts of the rotation CW transaction of the output signal ICb and the rotation CCW transaction of the output signal ICb carried out during the level low transaction of the output signal ICb (FIG. 11) and the level high transaction of the output signal ICb (FIG. 12). Those transactions are the same as the rotation CW transaction of the output signal ICa shown in FIG. 9 and the rotation CCW transaction of the output signal ICa shown in FIG. 10 respectively, other than the signal which is the basis of the judgment being changed from ICa to ICb or from ICb to ICa respectively. Thus, Steps S801–810 of FIG. 11 correspond to Steps 401–410 of FIG. 9 and Steps S901–S910 of FIG. 12 correspond to Steps S501–510 of FIG. 10. Thus, a detailed explanation of those steps need not be repeated here.

As explained in detail above, according to the described embodiment of the present invention, the rotational direction of the motor 20 is judged in accordance with the level of the one of the output signals ICa or ICb, which are simultaneously inputted from two Hall ICs 16, 17 when the other of the output signals ICa or ICb shows the edge. Accordingly, even when the record of the past edge is lost, the rotational direction of the motor 20 can be immediately judged. In addition, even when the rotational direction of the motor 20 is suddenly changed due to a sudden stop or a reversion (reverse operation) because of the occurrence of an entrapment, the rotational direction can be judged along with the occurrence of the edge. Thus, an error is not generated in the cumulated rotational number. Accordingly, the absolute position of the cover (e.g., sunroof panel) can be detected with a high degree of accuracy.

When an abnormality occurs in either one of the Hall ICs 16 or 17, the level of the output signal is maintained and does not change. This is judged as the reversion of the rotational direction being repeated. Accordingly, by counting the reversion of the rotational direction and when the repeated number becomes greater than the predetermined threshold value NR, it is judged that an abnormality exists or has occurred in the Hall IC 16, 17. Accordingly, the abnormality of the Hall ICs 16 and 17 can be found relatively easily and immediately.

By virtue of the maximum limitation of the rotational number of the motor 20, the edge intervals of the output signals ICa, ICb have a minimum limitation. By determining the edge interval of the output signals ICa, ICb as the cycle count and when the cycle count is less than the predetermined threshold value Ts, it is judged that noise has appeared. Accordingly, the edge which should not be counted can be ignored and an error in the cumulated rotational number does not occur. Thus, the absolute position of the cover (e.g., sunroof panel) is detected with further high accuracy.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, an equivalents employed, without departing from the spirit of the present invention. Accordingly, it is expressly intended that all such variations, changes, and equivalents which fall within the apart and scope of the present invention as defined in the claims, be embraced thereby.

What is claimed is:

1. An opening and closing control device for a cover provided at an opening comprising:

an electric motor which actuates the cover to open and close the opening;

at least two rotational number sensors for generating pulse signals having different phases from one another based on a rotational number of the electric motor;

position detecting means for detecting a position of the cover based on one of the pulse signals and for judging a moving direction of the cover in accordance with a signal level of one of the rotational number sensors when the other rotational number sensor detects an edge of the pulse signal; and wherein the position detecting means judges an abnormality of the rotational number sensor when the judged rotational direction repeats a reversion plural times.

2. The opening and closing control device according to claim 1, wherein the cover is slidably opened from a completely covered condition of the opening when the electric motor rotates in one direction and the cover is tiltably opened from the completely covered condition when the electric motor is rotated in an opposite direction.

3. The opening and closing control device according to claim 1, including a timer for counting a cycle of the pulse signal, the position detecting means judging that one of the pulse signals corresponds to noise when the cycle counted by the timer is shorter than a predetermined cycle.

4. An opening and closing control device for a cover provided at an opening comprising:

an electric motor which actuates the cover to open and close the opening, the electric motor having a shaft on which is provided a magnet;

at least two rotational number sensors which generate pulse signals having offset phases based on rotation of the shaft and the magnet;

means for determining a position of the cover based on one of the pulse signals and for judging a direction of rotation of the shaft based on a determination of a signal level of the pulse signal from one of the rotational number sensors when an edge of the pulse signal from the other rotational number sensor is detected; and wherein the means for determining the position of the cover judges an abnormality of the rotational number sensor when the judged rotational direction repeats a reversion plural times.

5. The opening and closing control device according to claim 4, wherein the cover is slidably opened from a completely covered condition of the opening when the electric motor rotates in one direction and the cover is tiltably opened from the completely covered condition when the electric motor is rotated in an opposite direction.

6. The opening and closing control device according to claim 4, including a timer for counting a cycle of the pulse signal, the means for determining the position of the cover judging that one of the pulse signals corresponds to noise when the cycle counted by the timer is shorter than a predetermined cycle.

* * * * *